United States Patent
Jiang

(10) Patent No.: US 12,238,768 B2
(45) Date of Patent: Feb. 25, 2025

(54) METHOD FOR UPLINK TRANSMISSION ON UNLICENSED BAND AND TERMINAL DEVICE

(71) Applicant: VIVO MOBILE COMMUNICATION CO.,LTD., Guangdong (CN)

(72) Inventor: Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 498 days.

(21) Appl. No.: 17/589,077

(22) Filed: Jan. 31, 2022

(65) Prior Publication Data

US 2022/0159723 A1 May 19, 2022

Related U.S. Application Data

(63) Continuation of application No. PCT/CN2020/103220, filed on Jul. 21, 2020.

(30) Foreign Application Priority Data

Aug. 2, 2019 (CN) .......................... 201910712174.3

(51) Int. Cl.
 *H04W 74/0816* (2024.01)
 *H04W 72/0446* (2023.01)
 *H04W 74/00* (2009.01)
 *H04W 74/08* (2009.01)

(52) U.S. Cl.
 CPC ... *H04W 74/0816* (2013.01); *H04W 72/0446* (2013.01); *H04W 74/006* (2013.01); *H04W 74/0866* (2013.01)

(58) Field of Classification Search
 None
 See application file for complete search history.

(56) References Cited

U.S. PATENT DOCUMENTS

| | | | |
|---|---|---|---|
| 2019/0253976 A1* | 8/2019 | Pelletier | H04W 52/146 |
| 2019/0335500 A1* | 10/2019 | Zhang | H04W 72/23 |
| 2020/0107373 A1* | 4/2020 | Roy | H04L 27/0006 |
| 2021/0014891 A1* | 1/2021 | Talarico | H04W 72/1273 |
| 2021/0378014 A1 | 12/2021 | Jiang et al. | |

(Continued)

FOREIGN PATENT DOCUMENTS

| | | |
|---|---|---|
| CN | 106162658 A | 11/2016 |
| CN | 107135490 A | 9/2017 |

(Continued)

OTHER PUBLICATIONS

Channel access procedures for NR unlicensed, 3GPP TSG RAN WG1 Meeting #97, May 13-May 17, 2019, p. 1-18, R1-1907261, QualcommIncorporated, Reno, US.

(Continued)

*Primary Examiner* — Otis L Thompson, Jr.
(74) *Attorney, Agent, or Firm* — IP&T GROUP LLP

(57) ABSTRACT

A method for uplink transmission on an unlicensed band includes: according to a time domain positional relationship between an uplink resource and an FFP of the FBE, listening for a busy/idle status of an uplink transmission channel, or detecting a channel occupancy time sharing indication; and determining, according to a listening result or a detection result, whether to perform uplink transmission on the uplink resource.

20 Claims, 7 Drawing Sheets

(56) References Cited

U.S. PATENT DOCUMENTS

| | | | | |
|---|---|---|---|---|
| 2022/0039151 A1* | 2/2022 | Li | ................ | H04W 74/006 |
| 2022/0110118 A1* | 4/2022 | Wu | ................ | H04W 24/08 |
| 2022/0131648 A1* | 4/2022 | El Hamss | ......... | H04W 74/0816 |
| 2022/0210823 A1* | 6/2022 | Alfarhan | ............ | H04L 1/1822 |

FOREIGN PATENT DOCUMENTS

| | | | |
|---|---|---|---|
| CN | 109495923 A | 3/2019 | |
| CN | 111278123 A | 6/2020 | |
| EP | 3425936 A1 | 1/2019 | |
| WO | 2016/071741 A1 | 5/2016 | |
| WO | 2016/148454 A1 | 9/2016 | |

OTHER PUBLICATIONS

Discussion on the channel access procedures, 3GPP TSG RAN WG1#97, May 13-17, 2019, R1-1906130, vivo, Reno, USA.
TxOP Frame Structure for NR unlicensed, 3GPP TSG RAN WG1 Meeting #94, Aug. 20-Aug. 24, 2018, p. 1-11, R1-1809476, Qualcomm Incorporated, Gothenburg, Sweden.
International Search Report and Written Opinion of International Application No. PCT/CN2020/103220 issued by the Chinese Patent Office on Oct. 23, 2020.

* cited by examiner

METHOD FOR UPLINK TRANSMISSION ON UNLICENSED BAND AND TERMINAL DEVICE

CROSS-REFERENCE TO RELATED APPLICATIONS

This application is a Bypass Continuation Application of PCT/CN2020/103220, filed on Jul. 21, 2020, which claims priority to Chinese Patent Application No. 201910712174.3, filed on Aug. 2, 2019, which are incorporated herein by reference in their entirety.

TECHNICAL FIELD

The present disclosure relates to the field of radio communications, and in particular to a method for uplink transmission on an unlicensed band and a terminal device.

BACKGROUND

In a future communication system, an unlicensed band may be used as a supplement to a licensed band to help a carrier expand its services. To keep consistent with the deployment of New Radio (NR) and maximize unlicensed access based on NR as much as possible, an unlicensed band may work in bands of 5 GHz, 37 GHz, and 60 GHz. A large bandwidth (80 or 100 MHz) in the unlicensed band can reduce the complexity of implementing a base station and user equipment (UE). The unlicensed band is shared by multiple radio access technologies (RATs), such as Wi-Fi, radar, and long term evolution (LTE) license assisted access (LAA). For that reason, the unlicensed band must comply with regulations, such as listen before talk (LBT), maximum channel occupancy time (MCOT), when it is used in some countries or regions, to ensure that all devices can use the resource in a fair way. When a transmission node needs to send information and perform LBT first, the transmission node performs power detection on a surrounding node. When detected power is lower than a threshold, it is considered that a channel is idle and the transmission node can send the information. Otherwise, it is considered that the channel is busy and the transmission node cannot send the information. The transmission node may be a base station, UE, a wireless access point (AP), or the like.

SUMMARY

Embodiments of the present disclosure provide a method for uplink transmission on an unlicensed band and a terminal device.

According to a first aspect, an embodiment of the present disclosure provides a method for uplink transmission on an unlicensed band, wherein the method is applied to a terminal device which is a frame based equipment (FBE), and includes: according to a time domain positional relationship between an uplink resource and a fixed frame period (FFP) of the FBE, listening for a busy/idle status of an uplink transmission channel, or detecting a channel occupancy time sharing indication; and determining, according to a listening result or a detection result, whether to perform uplink transmission on the uplink resource.

According to a second aspect, an embodiment of the present disclosure further provides a method for uplink transmission on an unlicensed band, wherein the method is applied to a base station which is an FBE, and includes: configuring or indicating an uplink resource to a terminal device, wherein the terminal device is FBE; and if a time domain starting position of the uplink resource is not starting time of the FFP of the FBE, performing a channel listening operation before the FFP where the uplink resource is located.

According to a third aspect, an embodiment of the present disclosure further provides a terminal device, wherein the terminal device is an FBE, and includes: a listening or detecting module, configured to listen for a busy/idle status of an uplink transmission channel or detect a channel occupancy time sharing indication according to a time domain positional relationship between an uplink resource and an FFP of the FBE; and a determining module, configured to determine, according to a listening result or a detection result, whether to perform uplink transmission on the uplink resource.

According to a fourth aspect, an embodiment of the present disclosure further provides a base station, wherein the base station is an FBE, and includes: a configuration or indication module, configured to configure or indicate an uplink resource to a terminal device, wherein the terminal device is FBE; an execution module, configured to perform, if a time domain starting position of the uplink resource is not starting time of the FFP of the FBE, a channel listening operation before the FFP where the uplink resource is located.

According to a fifth aspect, an embodiment of the present disclosure further provides a terminal device including: a memory storing computer program indications; and a processor, when the computer program indications are executed by the processor, the method for uplink transmission on an unlicensed band as described in the foregoing first aspect or second aspect is implemented.

According to a sixth aspect, an embodiment of the present disclosure further provides a non-transitory computer-readable storage medium, wherein the non-transitory computer-readable storage medium includes indications that, when run on a computer, cause the computer to execute the method for uplink transmission on an unlicensed band as described in the foregoing first aspect or second aspect.

BRIEF DESCRIPTION OF DRAWINGS

To describe the technical solutions in the embodiments of the present disclosure or the related art more clearly, the following briefly describes the accompanying drawings required for describing the embodiments or the related art. Apparently, the accompanying drawings in the following description show merely some embodiments recorded in the present disclosure, and a person of ordinary skill in the art may still derive other drawings from these accompanying drawings.

DETAILED DESCRIPTION

Figure 1:
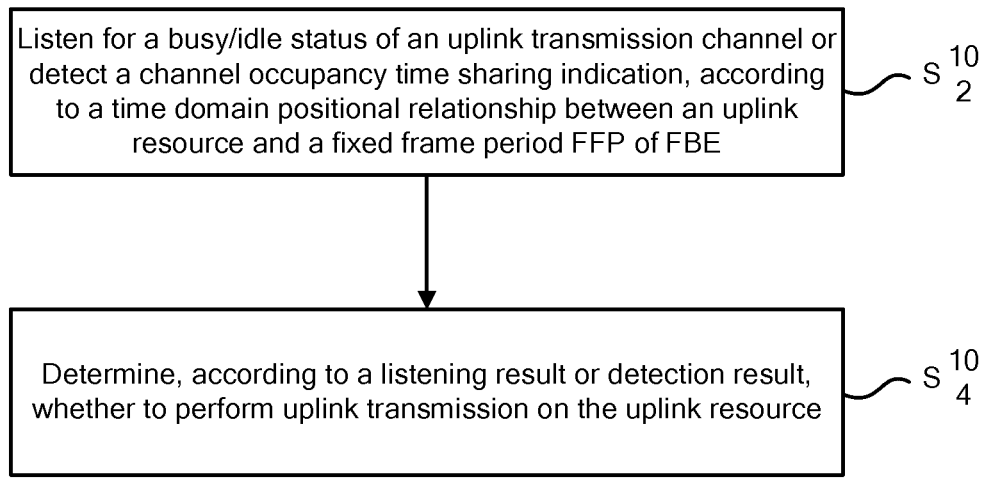
FIG. 1 is a schematic flowchart of a method for uplink transmission on an unlicensed band according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a global system for mobile communications (GSM), a code division multiple access (CDMA) system, a wideband code division multiple access (WCDMA) wireless system, a general packet radio service (GPRS) system, an LTE system, an NR system, and the like.

UE may also be referred to as a mobile terminal, an access terminal, a subscriber unit, a subscriber station, a mobile site, a mobile station, a remote station, a remote terminal, a mobile device, a user terminal, a terminal, a wireless communications device, a user agent or a user apparatus. The access terminal may be a cellular phone, a cordless phone, a session initiation protocol (SIP) phone, a wireless local loop (WLL) station, a personal digital assistant (PDA), a hand-held device having a wireless communication function, a computing device or another processing device connected to a wireless modem, an on-board device, a wearable device, a terminal device in a future 5G network, or a terminal device in a future evolved public land mobile network (PLMN).

In LTE LAA, in an unlicensed band, in order to reduce access latency, UE may perform autonomous UL transmission (AUL) without using a base station. The base station configures a time domain resource for the AUL for the UE via radio resource control (RRC). An AUL operation may be activated or deactivated by using downlink control information (DCI). When the AUL is activated, the base station notifies the UE of a frequency domain resource for the AUL transmission by means of activating DCI, or the like. The UE performs uplink transmission on the AUL resource. In LTE LAA, the UE needs to listen to a channel before performing the AUL transmission. When the channel is idle, the transmission can be performed within MCOT corresponding to an LBT priority class. In addition, when the UE can share channel occupancy time (COT) of the base station, the UE performs an LBT operation before performing the AUL transmission in the shared COT.

In NR, for the demand of low-latency services or periodic services, the NR supports the semi-static uplink configured grant (CG) transmission mode so as to reduce a signaling interaction process and ensure the low-latency requirement. A resource for CG transmission may be configured semi-statically via RRC signaling. When service data arrives, the UE can send data on an uplink channel of the CG.

A frame based equipment (FBE) means that sending/receiving timing of the equipment adopts a periodic structure, and a period therefor is a fixed frame period (FFP). For FBE-based uplink transmission, the UE determines whether a channel is idle before each FFP to determine whether to perform subsequent transmission. For scheduling-based uplink transmission (SUL), when a scheduling latency is longer than a remaining FFP, scheduled data will be in a next FFP, and a time domain starting position of a resource may not be at the boundary of the FFP. At this time, the UE cannot perform LBT within FFP. In addition, the time domain resource configured for the AUL may be not aligned with a starting boundary of the FFP. A relevant solution is that the UE shares the COT of the base station, that is, all uplink transmission is based on an indication from a 5G gNodeB (gNB). Even for AUL transmission, the gNB needs to instruct whether the UE can perform AUL transmission. This approach can resolve the problem described above, but forcing all UE transmission to be based on an indication from a gNB will bring additional overhead. In addition, the UE needs to demodulate an indication from the gNB before starting UL transmission, which makes the gNB unable to schedule or configure uplink transmission in the first half of FFP, resulting in a low efficiency to a certain extent.

FIG. 1 is a schematic flowchart of a method for uplink transmission on an unlicensed band according to an embodiment of the present disclosure. The method for uplink transmission on an unlicensed band is applied to a terminal device, and the terminal device is an FBE. The method in FIG. 1 may include the following steps.

S102. Listen for a busy/idle status of an uplink transmission channel or detect a channel occupancy time sharing indication according to a time domain positional relationship between an uplink resource and an FFP of FBE.

The channel occupancy time sharing indication is issued by a base station to the terminal device.

S104. Determine, according to a listening result or a detection result, whether to perform uplink transmission on the uplink resource.

In this embodiment, the uplink resource is a scheduled resource indicated by a base station in DCI or a CG transmission resource configured by a base station via RRC; the uplink transmission channel is a resource used for uplink transmission in the FFP, and the uplink resource is some or all of resources where the uplink transmission channel is located. The base station is FBE.

In the embodiments of the present disclosure, signaling overhead can be reduced by listening for the busy/idle status of the uplink transmission channel or detecting the channel occupancy time sharing indication according to the time domain positional relationship between the uplink resource and the FFP of the FBE, and then determining whether to perform the uplink transmission on the uplink resource according to a listening result or a detection result, without the need of performing each uplink transmission based on the indication from the base station. In addition, selecting a listening operation or detection operation according to the time domain position of the uplink resource can achieve flexible listening or detection operation during FBE uplink transmission, thereby improving the efficiency of uplink transmission.

The method in this embodiment of the present disclosure will be further described below with reference to some embodiments.

Figure 2A:
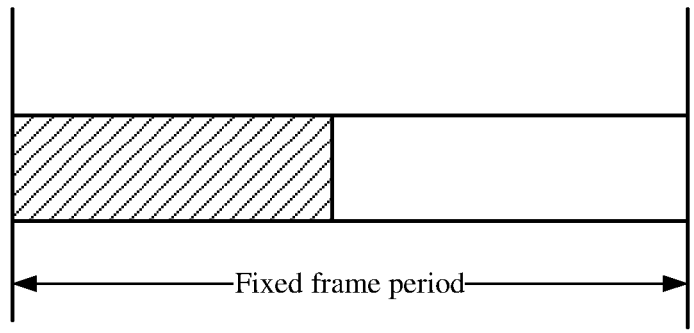
FIG. 2A is a first schematic diagram of time domain positional relationships between an uplink resource and an FFP of FBE according to an embodiment of the present disclosure.
Figure 2B:
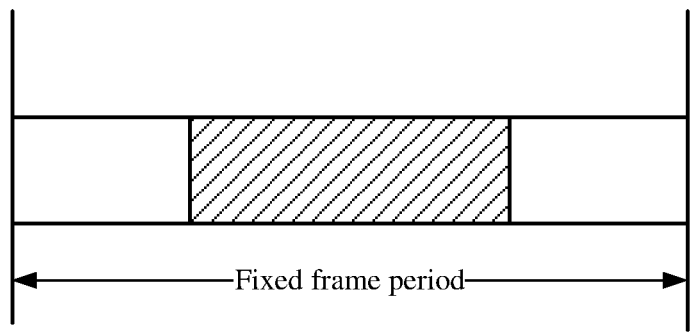
FIG. 2B is a second schematic diagram of time domain positional relationships between an uplink resource and an FFP of FBE according to an embodiment of the present disclosure.

FIGS. 2A and 2B are schematic diagrams of time domain positional relationships between an uplink resource and an FFP of FBE according to an embodiment of the present disclosure. In FIGS. 2A and 2B, the resource blocks filled with oblique lines represent uplink resources. It can be seen that in FIG. 2A, a time domain starting position of the uplink resource is starting time of an FFP of FBE, that is, the time domain starting position of the uplink resource is aligned with the starting position of the FFP (FFP boundary); and in FIG. 2B, the time domain starting position of the uplink resource is not the starting time of an FFP of FBE, that is, the time domain starting position of the uplink resource is not aligned with the starting position of the FFP (FFP boundary).

Figure 3:
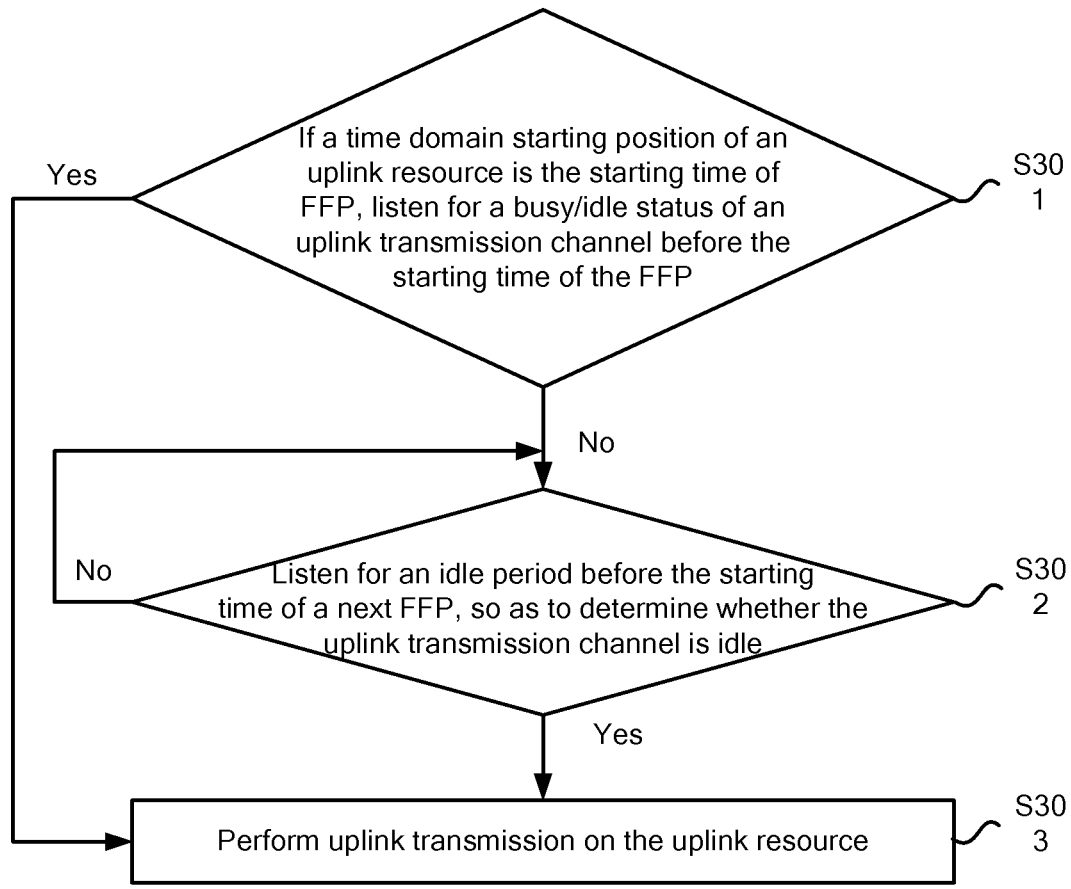
FIG. 3 is a schematic flowchart of a method for uplink transmission on an unlicensed band according to another embodiment of the present disclosure.

In one embodiment, if s time domain starting position of an uplink resource is s starting time of an FFP (as shown in FIG. 2A), a busy/idle status of an uplink transmission channel is listened before the starting time of the FFP. In some embodiments, the method for uplink transmission on an unlicensed band may be performed as the steps shown in FIG. 3.

S301. If the time domain starting position of an uplink resource is the starting time of an FFP, listen, in an idle period before the starting time of a current FFP, for whether an uplink transmission channel is idle. If not, that is, if the uplink transmission channel which is listened is busy, execute S302; if yes, that is, if the uplink transmission channel which is listened is idle, execute S303.

S302. Listen, in an idle period before the starting time of a next FFP, for whether the uplink transmission channel is idle. If not, that is, if the uplink transmission channel which is listened is busy, continue executing S302; if yes, that is, if the uplink transmission channel which is listened is idle, execute S303.

The idle period before the starting time of the next FFP is the idle period of a current FFP.

S303. Perform uplink transmission on the uplink resource.

Figure 4:
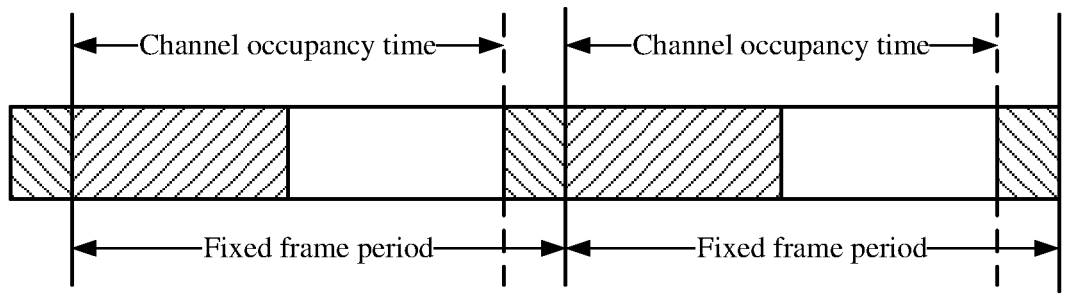
FIG. 4 is a schematic diagram of a time domain resource according to an embodiment of the present disclosure.

FIG. 4 is a schematic diagram of a time domain resource in this embodiment. FIG. 4 shows two consecutive FFPs, there is one idle period (for example, the period filled with backward oblique lines in FIG. 4) before the starting time of each FFP, the idle period before the starting time of each FFP is the idle period of a previous FFP, the period before the idle period of each FFP is the channel occupancy time COT of a corresponding FFP, and the resource block filled with forward oblique lines represents an uplink resource. In this embodiment, the time domain starting position of the uplink resource is the starting time of the FFP. Assuming that the first FFP shown in FIG. 4 is the current FFP, the terminal device listens for, in an idle period before the starting time of the first FFP, whether the uplink transmission channel is idle. If the channel which is listened is idle, perform uplink transmission on the uplink resource. If the channel which is listened is busy, listen, in an idle period before the starting time of the second FFP, for whether an uplink transmission channel is idle. If the channel which is listened is idle, perform uplink transmission on the uplink resource. If the channel which is listened is busy, listen, in an idle period before the starting time of the third FFP, for whether an uplink transmission channel is idle (not shown in FIG. 4).

It can be seen from this embodiment that when the time domain starting position of the uplink resource is the starting time of the FFP of the FBE, the terminal device can listen for a busy/idle status of the channel during the idle period of the FFP, and perform uplink transmission when the channel which is listened is idle, thereby avoiding the signaling overhead caused by making an indication by a base station and improving the efficiency of uplink transmission.

Figure 5:
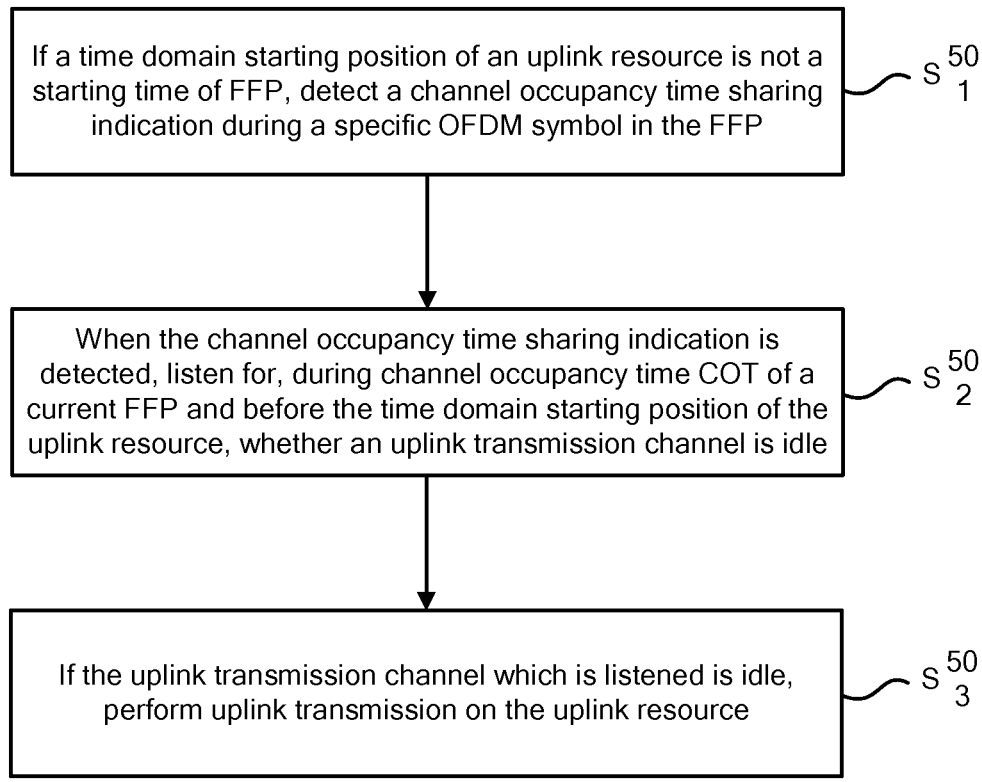
FIG. 5 is a schematic flowchart of a method for uplink transmission on an unlicensed band according to yet another embodiment of the present disclosure.

In one embodiment, if the time domain starting position of an uplink resource is not the starting time of an FFP of FBE (as shown in FIG. 2B), a channel occupancy time sharing indication is detected. In some embodiments, the method for uplink transmission on an unlicensed band may be performed as the steps shown in FIG. 5.

S501. If the time domain starting position of an uplink resource is not the starting time of an FFP, detect, in specific orthogonal frequency division multiplex (OFDM) symbols of the FFP, a channel occupancy time sharing indication.

The specific OFDM symbols (OS) are first N OFDM symbols in the FFP; the first N OFDM symbols are located before the time domain starting position of the uplink resource.

S502. When the channel occupancy time sharing indication is detected, listen, in the COT in a current FFP and before the time domain starting position of the uplink resource, for whether an uplink transmission channel is idle.

S503. If the uplink transmission channel which is listened is idle, perform uplink transmission on the uplink resource.

Figure 6:
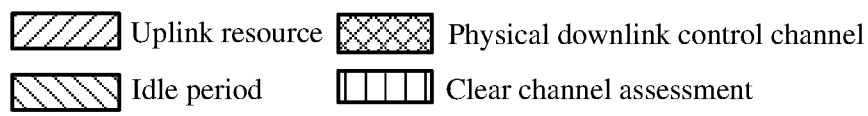
FIG. 6 is a schematic diagram of a time domain resource according to another embodiment of the present disclosure.
Figure 6:
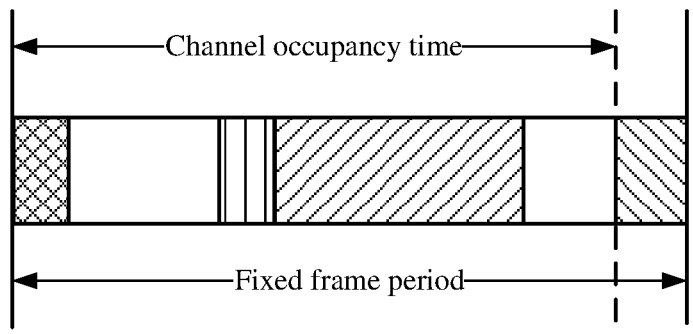

FIG. 6 is a schematic diagram of a time domain resource in this embodiment. In FIG. 6, the resource block filled with forward oblique lines represent an uplink resource. An FFP includes COT and an idle period (the period filled with backward oblique lines in FIG. 6). First N OSs are located before the time domain starting position of the uplink resource, that is, before the resource block filled with forward oblique lines shown in FIG. 6. Generally speaking, the first N OSs are a location for sending a physical downlink control channel (physical downlink control channel, PDCCH). In FIG. 6, the PDCCH is filled with crossed forward and backward oblique lines. In a case that a channel occupancy time sharing indication sent by a base station is detected, the terminal device listens for, in the COT in the current FFP and before the time domain starting position of an uplink resource (the position filled with vertical lines as shown in FIG. 6), whether an uplink transmission channel is idle, that is, performing a CCA.

It can be seen from the foregoing embodiment that when the time domain starting position of the uplink resource for the terminal device is not the starting time of the FFP of the FBE, the channel occupancy time sharing indication can be detected before the time domain starting position of the uplink resource of FFP, and after the channel occupancy time sharing indication is detected, the channel listening operation is performed before the time domain starting position of the uplink resource, thereby sharing the base station channel occupancy time and improving the efficiency of uplink transmission.

Figure 7:
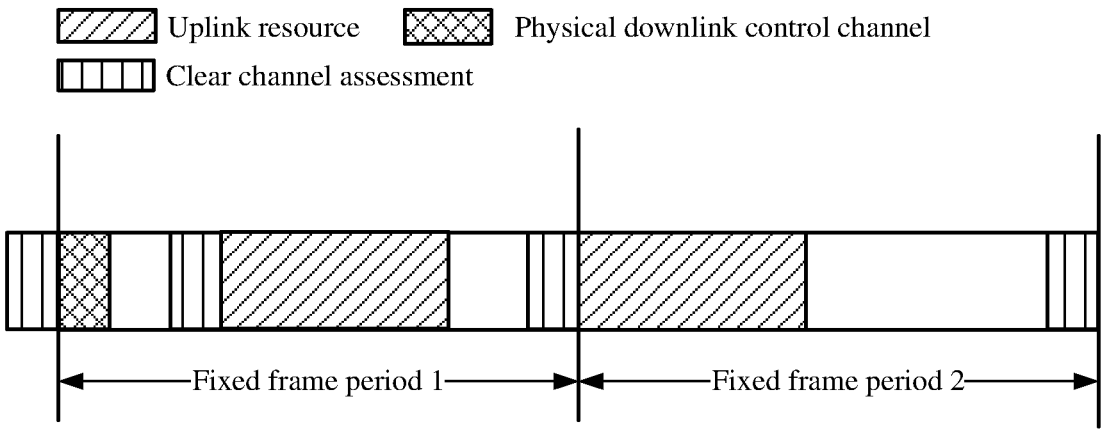
FIG. 7 is a schematic diagram of a configured CG transmission resource according to an embodiment of the present disclosure.

This embodiment of the present disclosure is described below by taking FBE UE that performs CG transmission as an example. Assuming that the time domain starting position for configuring a CG transmission resource is aligned with the starting position of an FFP, this ensures that UE can perform CG transmission immediately after completing a clear channel assessment CCA during an idle period, as shown in FFP2 (fixed frame period 2) in FIG. 7. In addition, considering that an FFP length may not completely match a configuration period of a CG transmission resource, the transmission resource may be configured at any position in the FFP, as shown in FFP1 (fixed frame period 1) in FIG. 7.

According to whether the time domain position for configuring the CG transmission resource is aligned with the starting position of the FFP, the UE decides whether to perform transmission by doing listening before talk (LBT) by itself, or by sharing the COT of the base station. For example, in FIG. 7, in FFP1 (fixed frame period 1), the CG transmission resource is not aligned with the starting position of FFP1, the UE cannot directly perform transmission by doing LBT before FFP. At this time, the UE detects a COT sharing indication on first few OSs of the FFP, wherein the first few OSs transmit the physical downlink control channel PDCCH shown in FIG. 7. When the base station detects that a channel is idle and sends a COT sharing indication to the UE in the PDCCH, the UE can perform a one-shot LBT (one-shot LBT) in COT of the base station after detecting the COT sharing indication, and start performing CG transmission when listening that the channel is idle. In FFP2 (fixed frame period 2), the time domain starting position for the CG transmission resource is aligned with the starting position of FFP2. Therefore, the UE directly performs LBT when performing CG transmission in FFP2, and starts the CG transmission when the channel which is listened is idle.

Figure 8:
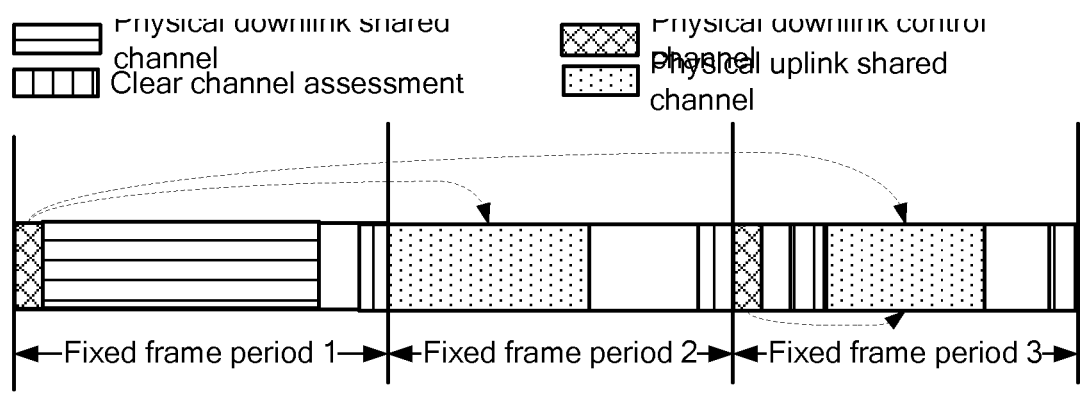
FIG. 8 is a schematic diagram of a scheduled resource according to an embodiment of the present disclosure.

This embodiment of the present disclosure is described below by taking FBE UE that performs scheduling transmission as an example. Assuming that the time domain starting position for a scheduled resource is aligned with the starting position of an FFP, this ensures that UE can perform uplink transmission immediately after completing a clear channel assessment CCA during an idle period, as shown in FFP2 (fixed frame period 2) in FIG. 8. In addition, considering issues such as UE capability and scheduling latency, a scheduled transmission resource may be configured at any position in an FFP, as shown in FFP3 (fixed frame period 3) in FIG. 8.

According to whether the time domain starting position for the scheduled resource is aligned with the starting position of the FFP, the UE decides whether to perform transmission by doing LBT by itself or to perform transmission by sharing COT of a base station. For example, in FIG. 8, the dashed arrow above the resource block represents a resource scheduling relationship, and the dashed arrow below the resource block represents a COT sharing indication. In FFP3, if a scheduled physical uplink shared channel PUSCH resource is not aligned with the starting position of FFP3, the UE cannot directly perform transmission by doing LBT before FFP3. At this time, the UE detects a COT sharing indication on first few OSs of the FFP3, wherein the first few OSs transmit the physical downlink control channel PDCCH shown in FIG. 8. When the base station detects that a channel is idle and sends a COT sharing indication to the UE, the UE can perform a one-shot LBT in COT of the base station after detecting the COT sharing indication, and start PUSCH transmission when listening that the channel is idle. In FFP2, the time domain starting position for a scheduled PUSCH resource is aligned with the starting position of FFP2. In this case, the UE does LBT directly before FFP2 when performing transmission in FFP2, and starts PUSCH transmission when listening that a channel is idle.

Figure 9:
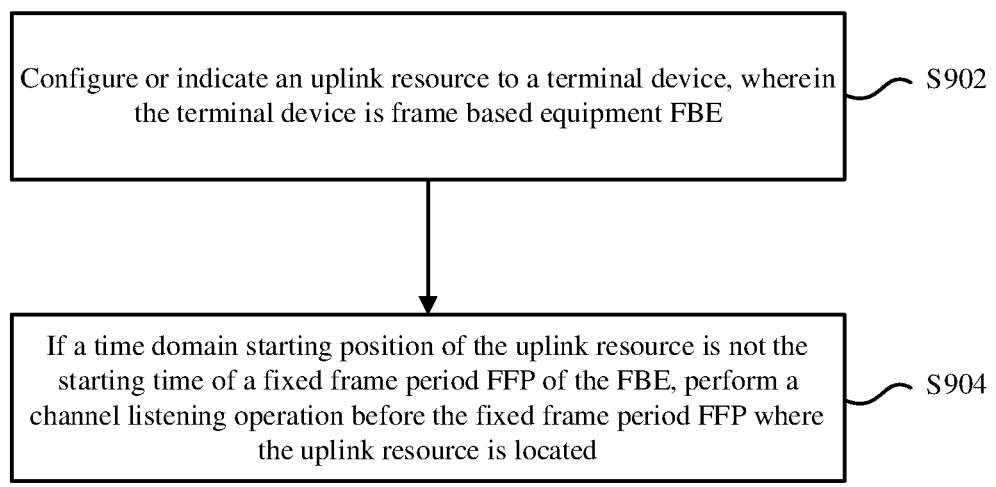
FIG. 9 is a schematic flowchart of a method for uplink transmission on an unlicensed band according to yet another embodiment of the present disclosure.

FIG. 9 is a schematic flowchart of a method for uplink transmission on an unlicensed band according to another embodiment of the present disclosure. The method for uplink transmission on an unlicensed band is applied to a base station which is an FBE. The method in FIG. 9 includes the following steps.

S902. Configure or indicate an uplink resource to a terminal device; wherein the terminal device is an FBE.

In this step, the base station may implement configuring or indicating the uplink resource to the terminal device in any of the following ways:
(1) indicate a scheduled resource in DCI sent to the terminal device; or,
(2) configure a CG transmission resource via RRC, and send the CG transmission resource to the terminal device.

S904. If the time domain starting position of the uplink resource is not the starting time of an FFP of the FBE, perform a channel listening operation before an FFP where the uplink resource is located.

In one embodiment, when performing S904, the base station listens for an idle/busy status of a downlink transmission channel before the FFP; and sends a channel occupancy time sharing indication to the terminal device if the downlink transmission channel which is listened is idle; wherein the channel occupancy time sharing indication is used to indicate that the terminal device can share channel occupancy time COT of the FFP.

In this embodiment of the present disclosure, after the base station configures or indicates the uplink resource to terminal device, the channel listening operation is performed only when the time domain starting position of the uplink resource is not the starting time of the FFP of the FBE, thereby sharing the channel occupancy time and improving the transmission efficiency to a certain extent.

Figure 10:
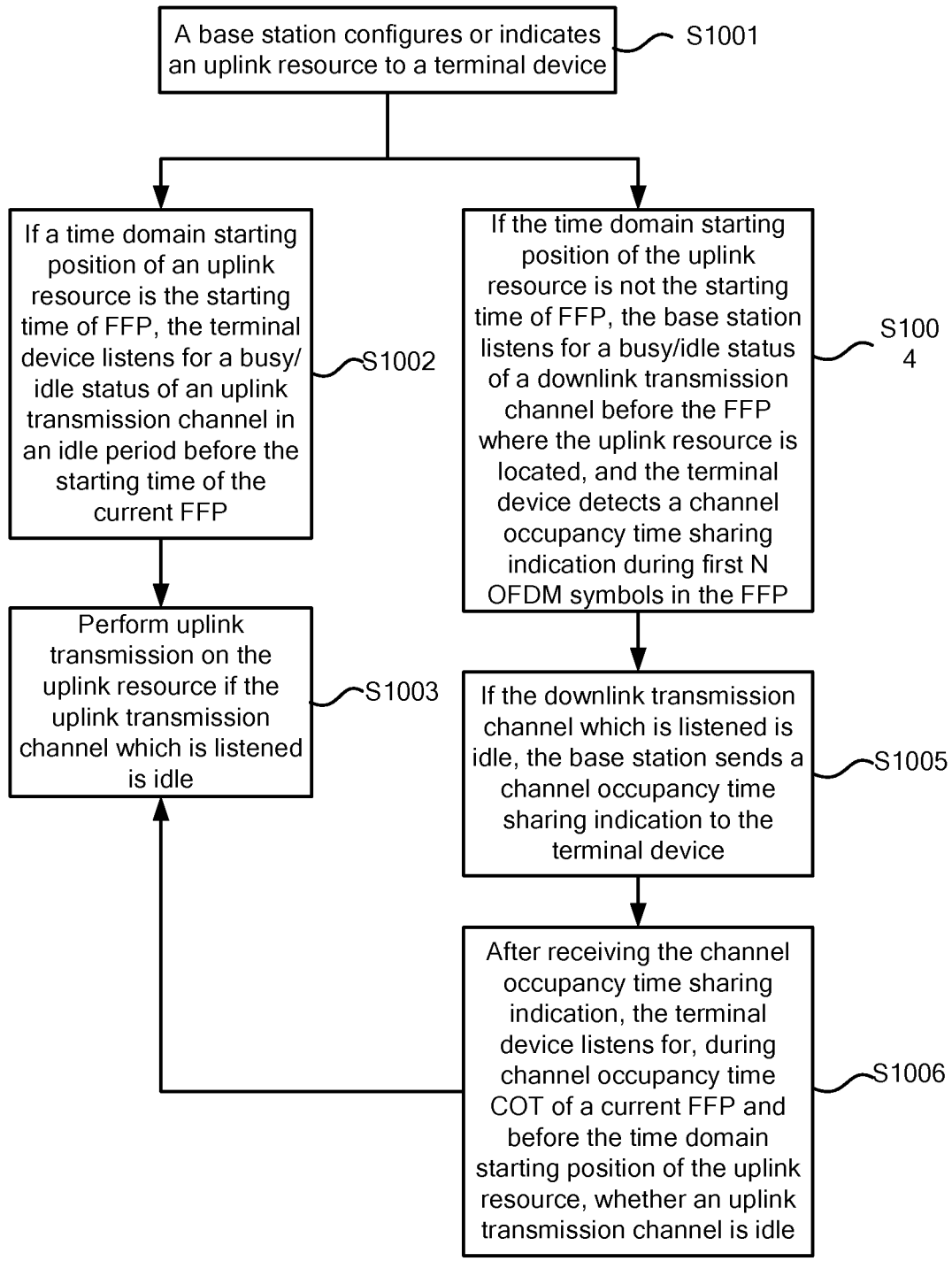
FIG. 10 is a schematic flowchart of a method for uplink transmission on an unlicensed band according to yet another embodiment of the present disclosure.

FIG. 10 is a schematic flowchart of a method for uplink transmission on an unlicensed band according to another embodiment of the present disclosure. In this embodiment, the method for uplink transmission on an unlicensed band is applied to a terminal device and a base station, wherein the terminal device and the base station may be FBE. The method in FIG. 10 includes the following steps.

S1001. The base station configures or indicates an uplink resource to the terminal device.

The base station may configure or indicate the uplink resource to the terminal device in any of the following ways:
(1) indicate a scheduled resource in DCI sent to the terminal device; or,
(2) configure a CG transmission resource via RRC, and send the CG transmission resource to the terminal device.

S1002. If the time domain starting position of the uplink resource is the starting time of an FFP, the terminal device listens an idle period before the starting time of a current FFP, so as to determine a busy/idle status of an uplink transmission channel.

S1003. When the uplink transmission channel which is listened is idle, perform uplink transmission on the uplink resource.

S1004. If the time domain starting position of the uplink resource is not the starting time of the FFP, the base station listens for a busy/idle status of a downlink transmission channel before an FFP where the uplink resource is located, and the terminal device detects, in first N OFDM symbols of the FFP, a channel occupancy time sharing indication.

The channel occupancy time sharing indication is sent by the base station to the terminal device, and the first N OFDM symbols are located before the time domain starting position of the uplink resource.

S1005. When listening that the downlink transmission channel is idle, the base station sends the channel occupancy time sharing indication to the terminal device.

The channel occupancy time sharing indication is used to indicate that the terminal device can share channel occupancy time COT of the FFP.

S1006. After receiving the channel occupancy time sharing indication, the terminal device listens for, a COT of a current FFP before the time domain starting position of the uplink resource, whether an uplink transmission channel is idle.

After this step, when the uplink transmission channel which is listened is idle, the uplink resource is used to perform uplink transmission, that is, S1003 is performed.

In this embodiment of the present disclosure, when the time domain starting position of the uplink resource is the starting time of the FFP, the terminal device can listen for the busy/idle status of the channel during the idle period of the previous FFP, and perform uplink transmission when listening that the channel is idle; in addition, when the time domain starting position of the uplink resource is not the starting time of the FFP, the terminal device can detect the channel occupancy time sharing indication in the first N OSs of the FFP, and execute the channel listening operation after detecting the channel occupancy time sharing indication, without the need of performing each uplink transmission based on the indication from the base station, thereby reducing the signaling overhead. In addition, the flexibility of listening or detecting operation during FBE uplink transmission is realized, and the efficiency of uplink transmission is improved.

The above describes specific embodiments of this specification. Other embodiments are within the scope of the appended claims. In some cases, the actions or steps described in the claims can be performed in a different order from that in the embodiments and the desired result can still be achieved. In addition, the process described in the accompanying drawings does not necessarily achieve the desired result in a specific order shown or a continuous order. In some implementations, multiple-task processing and parallel processing are also possible or may be advantageous.

Figure 11:
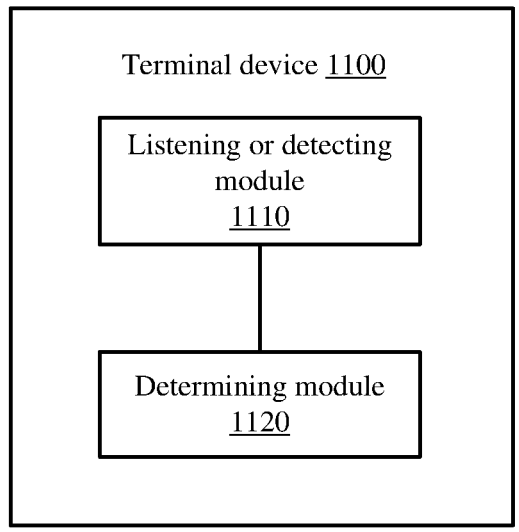
FIG. 11 is a schematic diagram of a structure of a terminal device according to an embodiment of the present disclosure.

FIG. 11 is a schematic diagram of a structure of a terminal device according to an embodiment of the present disclosure. Referring to FIG. 11, the terminal device 1100 is an FBE, which may include:

a listening or detecting module 1110, configured to listen for a busy/idle status of an uplink transmission channel or detect a channel occupancy time sharing indication according to a time domain positional relationship between an uplink resource and an FFP of the FBE; and a determining module 1120, configured to determine, according to a listening result or a detection result, whether to perform uplink transmission on the uplink resource.

In one embodiment, the listening or detecting module 1110 includes:

a first listening unit, configured to listen for a busy/idle status of an uplink transmission channel before the starting time of the FFP, if the time domain starting position of the uplink resource is the starting time of an FFP of the FBE.

In one embodiment, the first listening unit is further configured for:

listening, in an idle period before the starting time of a current FFP, for whether an uplink transmission channel is idle; and if the uplink transmission channel which is listened is busy, listening, in an idle period before the starting time of a next FFP, for whether the uplink transmission channel is idle.

In one embodiment, the determining module 1120 includes:

a first transmission unit, configured to perform uplink transmission on the uplink resource if the uplink transmission channel which is listened is idle.

In one embodiment, the listening or detecting module 1110 includes:

a detecting unit, configured to detect a channel occupancy time sharing indication if the time domain starting position of the uplink resource is not the starting time of an FFP of the FBE.

In one embodiment, the detecting unit is further configured for:

detecting a channel occupancy time sharing indication in specific OFDM symbols of the FFP, wherein the specific OFDM symbol is first N OFDM symbols in the FFP, and the first N OFDM symbols are located before the time domain starting position of the uplink resource.

In one embodiment, the determining module 1120 includes:

a second listening unit, configured to in a case that the base station has sent the channel occupancy time sharing indication is detected, listen, in channel occupancy time of a current FFP and before the time domain starting position of the uplink resource, for whether an uplink transmission channel is idle; and a second transmission unit, configured to perform uplink transmission on the uplink resource if the uplink transmission channel which is listened is idle.

In one embodiment, the uplink resource is a scheduled resource indicated by a base station in DCI or a t CG transmission resource configured by a base station via RRC.

The terminal device provided in this embodiment of the present disclosure can implement processes implemented by the terminal device in the foregoing method embodiments. To avoid repetition, details are not described herein again.

In the embodiments of the present disclosure, signaling overhead can be reduced by listening for the busy/idle status of the uplink transmission channel or detecting whether the base station sends the channel occupancy time sharing indication according to the time domain positional relationship between the uplink resource and the FFP of the FBE, and then determining whether to perform the uplink transmission on the uplink resource according to a listening result or a detection result, without the need of performing each uplink transmission based on the indication from the base station. In addition, selecting a listening operation or detection operation according to the time domain position of the uplink resource can achieve flexible listening or detection operation during FBE uplink transmission, thereby improving the efficiency of uplink transmission.

Figure 12:
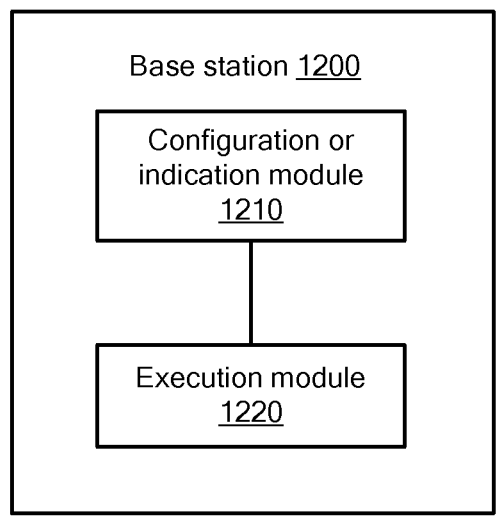
FIG. 12 is a schematic diagram of a structure of a base station according to an embodiment of the present disclosure.

FIG. 12 is a schematic diagram of a structure of a base station according to an embodiment of the present disclosure. Referring to FIG. 12, the base station 1200 is an FBE, which may include:

a configuration or indication module 1210, configured to configure or indicate an uplink resource to a terminal device; wherein the terminal device is FBE;

an execution module 1220, configured to perform, if the time domain starting position of the uplink resource is not the starting time of an FFP of the FBE, a channel listening operation before an FFP where the uplink resource is located.

In one embodiment, the execution module 1220 includes:

a third listening unit, configured to listen for a busy/idle status of a downlink transmission channel before an FFP; and a sending unit, configured to send a channel occupancy time sharing indication to the terminal device if the downlink transmission channel which is listened is idle; wherein the channel occupancy time sharing indication is used to indicate that the terminal device can share channel occupancy time of the FFP.

In one embodiment, the configuration or indication module 1210 includes:

an indicating unit, configured to indicate a scheduled resource in the DCI sent to the terminal device; or, a configuration and sending unit, configured to configure a CG transmission resource via the RRC, and send the CG transmission resource to the terminal device.

The base station provided in this embodiment of the present disclosure can implement the processes implemented by the base station in the foregoing method embodiments. To avoid repetition, details are not described herein again.

In this embodiment of the present disclosure, after the base station configures or indicates the uplink resource to terminal device, the channel listening operation is performed only when the time domain starting position of the uplink resource is not the starting time of the FFP of the FBE, thereby realizing flexibility and pertinence of channel listening at the base station side and improving the transmission efficiency to a certain extent.

Figure 13:
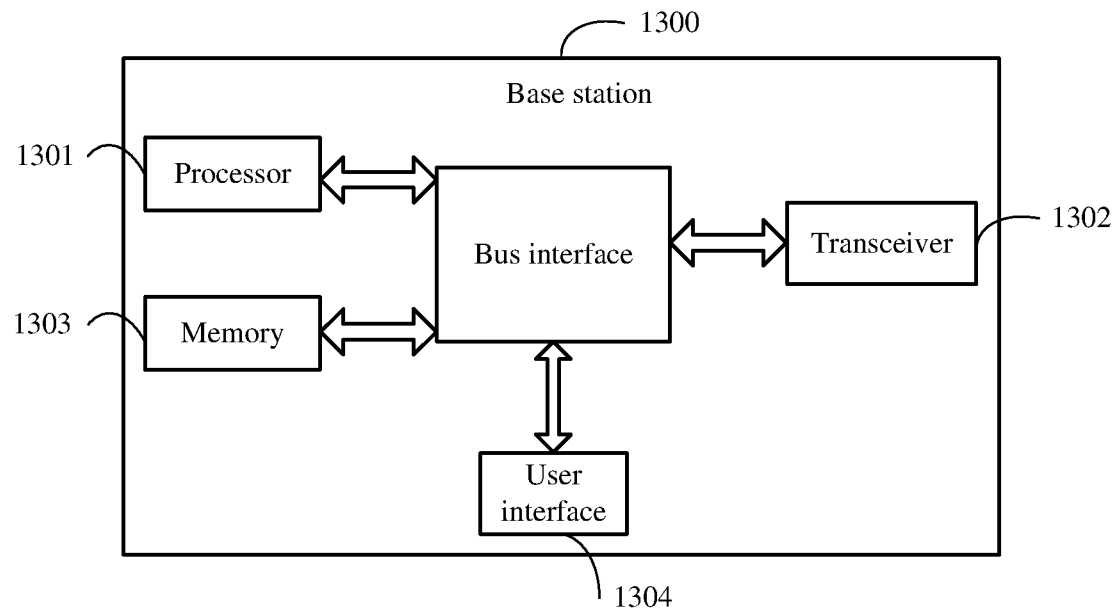
FIG. 13 is a schematic diagram of a structure of a base station according to another embodiment of the present disclosure.

FIG. 13 is a structural diagram of a base station which is applied to an embodiment of the present disclosure, and can implement the details of the method for uplink transmission on an unlicensed band executed by the base station in the foregoing embodiments and achieve the same effect. As shown in FIG. 13, the base station 1300 includes: a processor 1301, a transceiver 1302, a memory 1303, a user interface 1304, and a bus interface.

In this embodiment of the present disclosure, the base station 1300 further includes a computer program stored in the memory 1303 and capable of running on the processor 1301, and when the computer program is executed by the processor 1301, the following steps are implemented:

configuring or indicating an uplink resource to a terminal device; wherein the terminal device is an FBE; and if the time domain starting position of the uplink resource is not the starting time of an FFP of the FBE, performing a channel listening operation before the FFP.

In FIG. 13, a bus architecture may include any quantity of interconnected buses and bridges, which may be connected together by one or more processors represented by the processor 1301 and various circuits of a memory represented by the memory 1303. The bus architecture may further link various other circuits such as those of a peripheral device, a voltage regulator, and a power management circuit. These are well known in the art, and therefore are not further described in this specification. The bus interface provides an interface. The transceiver 1302 may be multiple elements, including a transmitter and a receiver, and provides a unit for communicating on a transmission medium with various other devices. For different user equipment, the user interface 1304 may alternatively be an interface for externally and internally connecting a required device. The connected device includes but is not limited to: a keypad, a display, a loudspeaker, a microphone, a joystick, and the like.

The processor 1301 is responsible for bus architecture management and general processing. The memory 1303 may store data used by the processor 1301 when the processor 1301 performs an operation.

Optionally, when the computer program is executed by the processor 1301, the following steps may be further implemented:

listening for a busy/idle status of a downlink transmission channel before an FFP where the uplink resource is located; and sending a channel occupancy time sharing indication to the terminal device if the downlink transmission channel which is listened is idle; wherein the channel occupancy time sharing indication is used to indicate that the terminal device can share channel occupancy time of the FFP.

Optionally, when the computer program is executed by the processor 1301, the following steps may be further performed:

indicating a scheduled resource in the DCI sent to the terminal device; or configuring a CG transmission resource via the RRC, and sending the CG transmission resource to the terminal device.

In this embodiment of the present disclosure, after the base station configures or indicates the uplink resource to terminal device, the channel listening operation is performed only when the time domain starting position of the uplink resource is not the starting time of the FFP of the FBE, thereby realizing flexibility and pertinence of channel listening at the base station side and improving the transmission efficiency to a certain extent.

Figure 14:
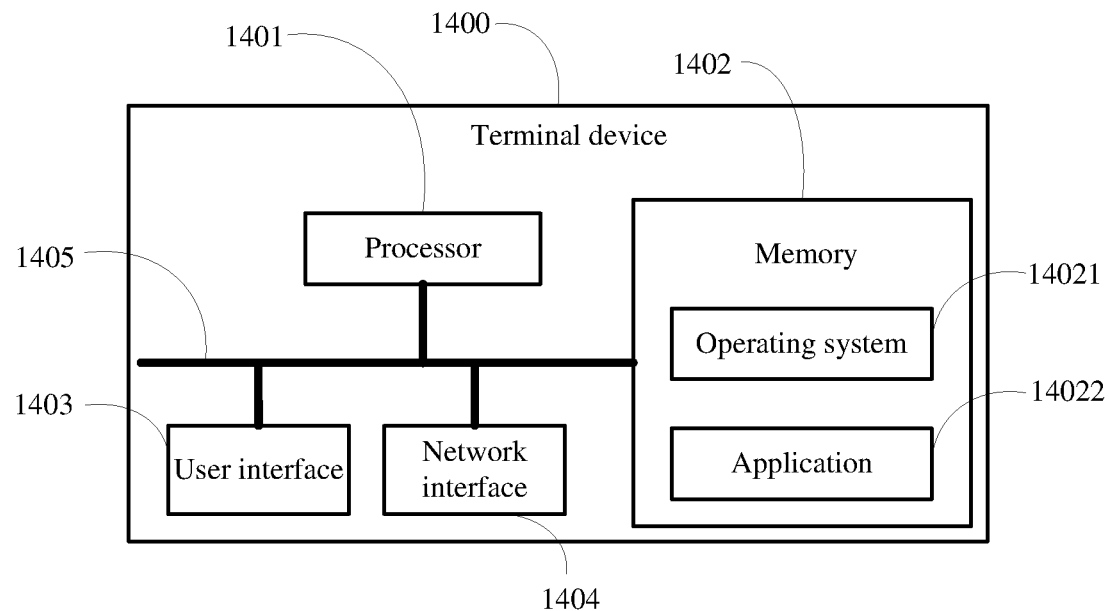
FIG. 14 is a block diagram of a terminal device according to another embodiment of the present disclosure.

FIG. 14 is a block diagram of a terminal device according to another embodiment of the present disclosure. The terminal device 1400 shown in FIG. 14 includes at least one processor 1401, a memory 1402, at least one network interface 1404, and a user interface 1403. All components of the terminal device 1400 are coupled together by using the bus system 1405. It can be understood that the bus system 1405 is configured to implement a connection and communication between these components. In addition to a data bus, the bus system 1405 may include a power bus, a control bus, and a status signal bus. However, for clarity of description, various buses are marked as the bus system 1405 in FIG. 14.

The user interface 1403 may include a display, a keyboard, or a clicking device, for example, a mouse, a trackball, a touch panel, or a touchscreen.

It may be understood that the memory 1402 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1402 in the system and the method that are described in the embodiments of the present disclosure is intended to include but is not limited to these memories and a memory of any other proper type.

In some implementation manners, the memory 1402 stores the following element, an executable module or a data structure, or a subset thereof, or an extension set thereof: an operating system 14021 and an application 14022.

The operating system 14021 includes various system programs, such as a framework layer, a kernel library layer, and a driver layer, and is configured to implement various basic services and process hardware-based tasks. The application program 14022 includes various application programs, such as a media player and a browser, and is configured to implement various application services. A program for implementing the method in the embodiments of the present discourse may be included in the application program 14022.

In this embodiment of the present disclosure, the terminal device 1400 further includes a computer program stored in the memory 1409 and capable of running on a processor 1410, and when the computer program is executed by the processor 1401, the following steps are implemented:

listening for a busy/idle status of an uplink transmission channel or detect a channel occupancy time sharing indication according to a time domain positional relationship between an uplink resource and an FFP of FBE; and determining, according to a listening result or a detection result, whether to perform uplink transmission on the uplink resource.

The methods disclosed in the foregoing embodiments of the present disclosure may be applied to the processor 1401, or may be implemented by the processor 1401. The processor 1401 may be an integrated circuit chip having a signal processing capability. During implementation, each step of the foregoing method may be completed by using an integrated logic circuit of hardware in the processor 1401 or an indication in a form of software. The foregoing processor 1401 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1401 may implement or perform the methods, the steps, and logical block diagrams that are disclosed in the embodiments of the present disclosure. The general-purpose processor may be a microprocessor or may be any conventional processor or the like. Steps of the methods disclosed with reference to the embodiments of the present disclosure may be directly executed and accomplished via a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 1402, and the processor 1401 reads information from the memory 1402 and completes the steps of the foregoing method in combination with hardware of the processor 1401. Optionally, the computer-readable storage medium stores a computer program, and when the computer program is executed by the processor 1401, the steps of the foregoing resource reuse method embodiment are implemented.

It may be understood that the embodiments described in the embodiments of the present disclosure may be implemented by hardware, software, firmware, middleware, microcode, or a combination thereof. For hardware implementation, a processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, technologies described in the embodiments of the present disclosure may be implemented through modules (for example, procedures or functions) that implement the functions in the embodiments of the present disclosure. Software code may be stored in a memory and executed by a processor. The memory may be implemented in the processor or outside the processor.

Optionally, when the computer program is executed by the processor 1401, the following steps may be further performed:

if the time domain starting position of the uplink resource is the starting time of an FFP of the FBE, listening for a busy/idle status of an uplink transmission channel before the starting time of the FFP.

Optionally, when the computer program is executed by the processor 1401, the following steps may be further performed:

listening, in an idle period before the starting time of a current FFP, for whether an uplink transmission channel is idle; and if the uplink transmission channel which is listened is busy, listening, in an idle period before the starting time of a next FFP, for whether the uplink transmission channel is idle.

Optionally, when the computer program is executed by the processor 1401, the following steps may be further performed:

if the uplink transmission channel which is listened is idle, performing uplink transmission on the uplink resource.

Optionally, when the computer program is executed by the processor 1401, the following steps may be further performed:

detecting a channel occupancy time sharing indication if the time domain starting position of the uplink resource is not the starting time of an FFP of the FBE.

Optionally, when the computer program is executed by the processor 1401, the following steps may be further performed:

detecting a channel occupancy time sharing indication in specific OFDM symbols of the FFP, wherein the specific OFDM symbols are first N OFDM symbols in the FFP, and the first N OFDM symbols are located before the time domain starting position of the uplink resource.

Optionally, when the computer program is executed by the processor 1401, the following steps may be further performed:

when the channel occupancy time sharing indication is detected, listening a channel in channel occupancy time in a current FFP and before the time domain starting position of the uplink resource, so as to determine whether the uplink transmission channel is idle;

if the uplink transmission channel which is listened is idle, performing uplink transmission on the uplink resource.

Optionally, the uplink resource is a scheduled resource indicated by the base station in the DCI or a CG transmission resource configured by the base station via RRC.

The terminal device 1400 can implement each process implemented by the terminal device in the foregoing embodiment. To avoid repetition, details are not described herein again.

In the embodiments of the present disclosure, signaling overhead can be reduced by listening for the busy/idle status of the uplink transmission channel or detecting the channel occupancy time sharing indication according to the time domain positional relationship between the uplink resource and the FFP of the FBE, and then determining whether to perform the uplink transmission on the uplink resource according to a listening result or a detection result, without the need of performing each uplink transmission based on the indication from the base station. In addition, selecting a listening operation or detection operation according to the time domain position of the uplink resource can achieve flexible listening or detection operation during FBE uplink transmission, thereby improving the efficiency of uplink transmission.

Optionally, an embodiment of the present disclosure further provides a terminal device including a processor 1410, a memory 1409, and a computer program stored in the memory 1409 and capable of running on the processor 1410. When the computer program is executed by the processor 1410, each process of the foregoing embodiments of the method for uplink transmission on an unlicensed band is implemented, and a same technical effect can be achieved. To avoid repetition, details are not described herein.

An embodiment of the present disclosure further provides a non-transitory computer-readable storage medium. The non-transitory computer-readable storage medium stores a computer program. When the computer program is executed by a processor, each process of the foregoing embodiments of the method for uplink transmission on an unlicensed band is implemented, and a same technical effect can be achieved. To avoid repetition, details are not described again herein. The non-transitory computer-readable storage medium is, for example, a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several indications for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

What is claimed is:

1. A method for uplink transmission on an unlicensed band, wherein the method is applied to a terminal device which is a frame based equipment (FBE), and the method comprises:

detecting a channel occupancy time sharing indication, according to a time domain positional relationship between an uplink resource and a fixed frame period (FFP) of the FBE; and determining, according to a detection result, whether to perform uplink transmission on the uplink resource;

wherein the determining, according to a detection result, whether to perform uplink transmission on the uplink resource comprises:

in a case that the channel occupancy time sharing indication is detected, listening, in the channel occupancy time in a current FFP and before a time domain starting position of the uplink resource, for whether the uplink transmission channel is idle;

if the uplink transmission channel which is listened is idle, performing uplink transmission on the uplink resource.

2. The method according to claim 1, wherein the detecting a channel occupancy time sharing indication according to a time domain positional relationship between an uplink resource and an FFP of the FBE comprises:

detecting the channel occupancy time sharing indication if the time domain starting position of the uplink resource is not starting time of the FFP of the FBE.

3. The method according to claim 2, wherein the detecting a channel occupancy time sharing indication comprises:

detecting a channel occupancy time sharing indication in specific orthogonal frequency division multiplex (OFDM) symbols of the FFP, wherein the specific OFDM symbols are first N OFDM symbols in the FFP, and the first N OFDM symbols are located before the time domain starting position of the uplink resource.

4. The method according to claim 1, wherein the uplink resource is: a scheduled resource indicated by a base station in downlink control information (DCI), or a configured grant (CG) transmission resource configured by the base station via radio resource control (RRC).

5. The method according to claim 1, wherein the method further comprises:

listening for a busy/idle status of an uplink transmission channel according to the time domain positional relationship between the uplink resource and the FFP of the FBE; and determining, according to a listening result, whether to perform uplink transmission on the uplink resource.

6. The method according to claim 5, wherein the listening for a busy/idle status of an uplink transmission channel, according to the time domain positional relationship between the uplink resource and the FFP of the FBE comprises:

if the time domain starting position of the uplink resource is starting time of the FFP of the FBE, listening for the busy/idle status of the uplink transmission channel before the starting time of the FFP.

7. The method according to claim 6, wherein the listening for a busy/idle status of an uplink transmission channel before the starting time of the FFP comprises:

listening, in an idle period before the starting time of a current FFP, for whether an uplink transmission channel is idle; and listening, in an idle period before the starting time of a next FFP, for whether the uplink transmission channel is idle, if the uplink transmission channel which is listened is busy.

8. The method according to claim 7, wherein the determining, according to a listening result, whether to perform uplink transmission on the uplink resource comprises:

performing uplink transmission on the uplink resource, if the uplink transmission channel which is listened is idle.

9. A terminal device, which is a frame based equipment (FBE) and comprising:

a memory storing computer program indications; and a processor, wherein the computer program indications, when executed by the processor, causes the terminal device to perform:

detecting a channel occupancy time sharing indication, according to a time domain positional relationship between an uplink resource and a fixed frame period (FFP) of the FBE; and determining, according to a detection result, whether to perform uplink transmission on the uplink resource;

wherein the computer program indications, when executed by the processor, cause the terminal device to perform:

in a case that the channel occupancy time sharing indication is detected, listening, in the channel occupancy time in a current FFP and before a time domain starting position of the uplink resource, for whether the uplink transmission channel is idle;

if the uplink transmission channel which is listened is idle, performing uplink transmission on the uplink resource.

10. The terminal device according to claim 9, wherein the computer program indications, when executed by the processor, cause the terminal device to perform:

detecting the channel occupancy time sharing indication if the time domain starting position of the uplink resource is not starting time of the FFP of the FBE.

11. The terminal device according to claim 10, wherein the computer program indications, when executed by the processor, cause the terminal device to perform:

detecting a channel occupancy time sharing indication in specific orthogonal frequency division multiplex (OFDM) symbols of the FFP, wherein the specific OFDM symbols are first N OFDM symbols in the FFP, and the first N OFDM symbols are located before the time domain starting position of the uplink resource.

12. The terminal device according to claim 9, wherein the uplink resource is: a scheduled resource indicated by a base station in downlink control information (DCI), or a configured grant (CG) transmission resource configured by the base station via radio resource control (RRC).

13. The terminal device according to claim 9, wherein the computer program indications, when executed by the processor, cause the terminal device to further perform:

listening for a busy/idle status of an uplink transmission channel according to the time domain positional relationship between the uplink resource and the FFP of the FBE; and determining, according to a listening result, whether to perform uplink transmission on the uplink resource.

14. The terminal device according to claim 13, wherein the computer program indications, when executed by the processor, cause the terminal device to perform:

if the time domain starting position of the uplink resource is starting time of the FFP of the FBE, listening for the busy/idle status of the uplink transmission channel before the starting time of the FFP.

15. The terminal device according to claim 14, wherein the computer program indications, when executed by the processor, cause the terminal device to perform:

listening, in an idle period before the starting time of a current FFP, for whether an uplink transmission channel is idle; and listening, in an idle period before the starting time of a next FFP, for whether the uplink transmission channel is idle, if the uplink transmission channel which is listened is busy.

16. The terminal device according to claim 15, wherein the computer program indications, when executed by the processor, cause the terminal device to perform:

performing uplink transmission on the uplink resource, if the uplink transmission channel which is listened is idle.

17. A non-transitory computer-readable storage medium, storing a computer program, wherein the computer program, when executed by a processor, causes the processor to perform:

detecting a channel occupancy time sharing indication, according to a time domain positional relationship between an uplink resource and a fixed frame period (FFP) of the FBE; and determining, according to a detection result, whether to perform uplink transmission on the uplink resource;

wherein the computer program, when executed by the processor, causes the processor to perform:

in a case that the channel occupancy time sharing indication is detected, listening, in the channel occupancy time in a current FFP and before a time domain starting position of the uplink resource, for whether the uplink transmission channel is idle;

if the uplink transmission channel which is listened is idle, performing uplink transmission on the uplink resource.

18. The non-transitory computer-readable storage medium according to claim 17, wherein the computer program, when executed by a processor, causes the processor to perform:

detecting the channel occupancy time sharing indication if the time domain starting position of the uplink resource is not starting time of the FFP of the FBE.

19. The non-transitory computer-readable storage medium according to claim 18, wherein the computer program, when executed by a processor, causes the processor to perform:
 detecting a channel occupancy time sharing indication in specific orthogonal frequency division multiplex (OFDM) symbols of the FFP, wherein the specific OFDM symbols are first N OFDM symbols in the FFP, and the first N OFDM symbols are located before the time domain starting position of the uplink resource.

20. The non-transitory computer-readable storage medium according to claim 17, wherein the uplink resource is: a scheduled resource indicated by a base station in downlink control information (DCI), or a configured grant (CG) transmission resource configured by the base station via radio resource control (RRC).

* * * * *